United States Patent
Hitosugi

(10) Patent No.: US 10,565,294 B2
(45) Date of Patent: Feb. 18, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takayuki Hitosugi, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 15/482,115

(22) Filed: Apr. 7, 2017

(65) Prior Publication Data

US 2017/0308515 A1    Oct. 26, 2017

(30) Foreign Application Priority Data

Apr. 22, 2016  (JP) .................................. 2016-086578

(51) Int. Cl.
| | |
|---|---|
| *G06F 17/00* | (2019.01) |
| *G06K 9/46* | (2006.01) |
| *G06F 17/22* | (2006.01) |
| *G06F 17/21* | (2006.01) |

(52) U.S. Cl.
CPC ........ G06F 17/2264 (2013.01); G06F 17/212 (2013.01); G06F 17/2288 (2013.01)

(58) Field of Classification Search
CPC ........ G06K 15/00; G06F 17/2288; G06T 9/00
USPC .................................. 715/229, 200; 382/244
See application file for complete search history.

(56) References Cited

U.S. PATENT DOCUMENTS

| | | | | |
|---|---|---|---|---|
| 5,758,042 A | * | 5/1998 | Deschuytere | H04N 1/3871 358/1.15 |
| 6,337,747 B1 | * | 1/2002 | Rosenthal | G06K 15/02 358/1.15 |
| 8,855,438 B2 | * | 10/2014 | Hitosugi | G06T 9/00 382/239 |
| 2012/0288211 A1 | * | 11/2012 | Hitosugi | G06T 9/00 382/244 |

FOREIGN PATENT DOCUMENTS

JP    2004-171533 A    6/2004

* cited by examiner

*Primary Examiner* — Manglesh M Patel
(74) *Attorney, Agent, or Firm* — Venable LLP

(57) ABSTRACT

An image processing apparatus comprises: a division unit that divides input data on a predetermined basis; a generation unit that generates, from the input data divided by the division unit, intermediate data on the predetermined basis; an updating unit that updates the intermediate data by converting rendering contents of the intermediate data generated by the generation unit into image data; a transfer unit that transfers, each time the generation unit generates the intermediate data, the generated intermediate data to a raster image processing unit; and a determination unit that determines, before the transfer unit transfers first intermediate data generated from the input data, whether to perform updating for each intermediate data corresponding to the input data by the updating unit based on a rendering command of the input data or the first intermediate data.

31 Claims, 12 Drawing Sheets

FIG. 3
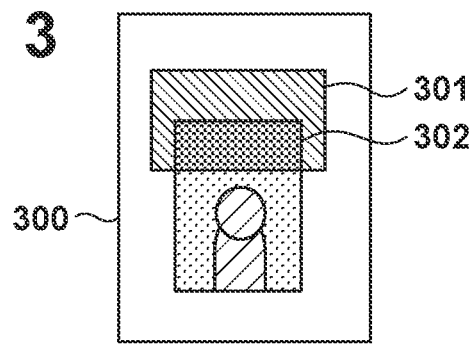
FIG. 4A
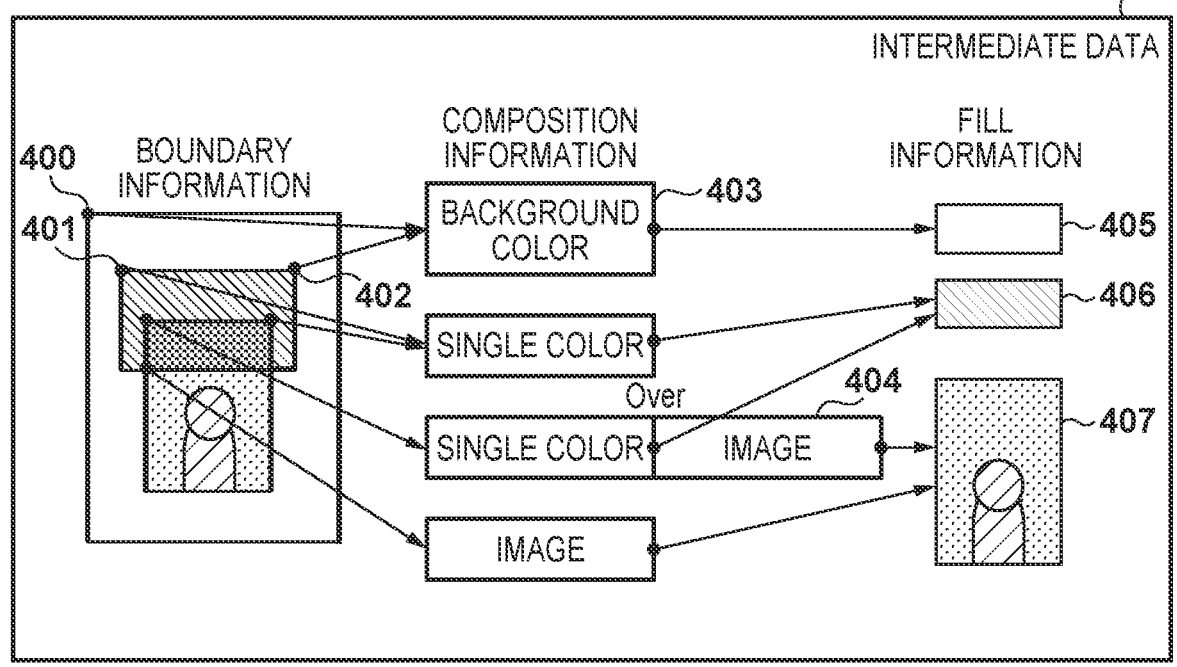
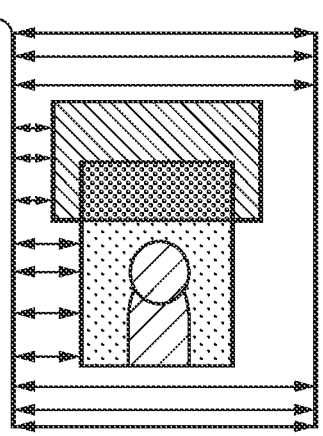
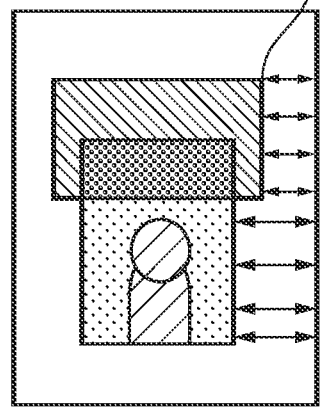
FIG. 4B   FIG. 4C

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

Conventionally, as an image processing method, there is used a method of generating a raster image by interpreting a PDL (Page Description Language) to generate a DL (display list) as intermediate data and generating a raster image from this DL. Also, when a DL exceeds a predetermined size, there is known a method called fallback in which a DL of that point undergoes rendering, image data conversion, and image compression, and is subsequently combined with the remaining DL. In general, lossy compression is used to perform image compression in fallback, and this fallback serves as an operational guarantee so a DL will not exceed the upper-limit data size that can be spooled at once.

In the generation of a raster image, when lossy compression is performed on only a partial region of a page, a boundary line will become noticeable due to image quality difference with the peripheral region, and the visual quality is degraded. Hence, Japanese Patent Laid-Open No. 2004-171533 aims to prevent the boundary line from becoming noticeable due to image quality difference between a background image generated from performing image data conversion and image compression of an intermediate DL and a foreground image generated from the remaining DL. Particularly, there is disclosed a method of preventing the boundary line from becoming noticeable by degrading the entire image when an image having a degraded image quality is included.

To output a raster image, intermediate data is generated for an entire page, a raster image is then generated by rendering the intermediate data of the entire page, and the generated raster image is output by an output apparatus. At this time, if the generation and rendering of intermediate data are performed in separate apparatuses, rendering cannot be executed until the intermediate data of the entire page has been generated. This can problematically lead to a reduction in the processing performance of the overall system.

In Japanese Patent Laid-Open No. 2004-171533, if degradation processing of the entire image is performed until the start of rendering, the wait for rendering and output processing will be elongated.

SUMMARY OF THE INVENTION

According to one aspect of the present invention, there is provided an image processing apparatus comprising: a division unit configured to divide input data on a predetermined basis; a generation unit configured to generate, from the input data divided by the division unit, intermediate data on the predetermined basis; an updating unit configured to update the intermediate data by converting rendering contents of the intermediate data generated by the generation unit into image data; a transfer unit configured to transfer, each time the generation unit generates the intermediate data, the generated intermediate data to a raster image processing unit; and a determination unit configured to determine, before the transfer unit transfers first intermediate data generated from the input data, whether to perform updating for each intermediate data corresponding to the input data by the updating unit based on a rendering command of the input data or the first intermediate data.

According to another aspect of the present invention, there is provided an image processing method, comprising: dividing input data on a predetermined basis; generating, from the divided input data, intermediate data on the predetermined basis; updating the intermediate data by converting rendering contents of the generated intermediate data into image data; transferring, each time the intermediate data is generated, the generated intermediate data to a raster image processing unit; and determining, before transferring first intermediate data generated from the input data, whether to perform updating for each intermediate data corresponding to the input data based on a rendering command of the input data or the first intermediate data.

According to another aspect of the present invention, there is provided a non-transitory computer-readable storage medium configured to store a program to cause a computer to function as an image processing apparatus, comprising: a division unit configured to divide input data on a predetermined basis; a generation unit configured to generate, from the input data divided by the division unit, intermediate data on the predetermined basis; an updating unit configured to update the intermediate data by converting rendering contents of the intermediate data generated by the generation unit into image data; a transfer unit configured to transfer, each time the generation unit generates the intermediate data, the generated intermediate data to a raster image processing unit; and a determination unit configured to determine, before the transfer unit transfers first intermediate data generated from the input data, whether to perform updating for each intermediate data corresponding to the input data by the updating unit based on a rendering command of the input data or the first intermediate data.

According to the present invention, the start time of raster image generation can be shortened while maintaining visual quality when generating a raster image by interpreting a PDL.

Further features of the present invention will become apparent from the following description of exemplary embodiments (with reference to the attached drawings).

BRIEF DESCRIPTION OF THE DRAWINGS

FIG. 3 is a view showing an example of input data according to the first embodiment;

FIGS. 4A, 4B, and 4C are views showing examples of intermediate data according to the first embodiment;

DESCRIPTION OF THE EMBODIMENTS

An embodiment according to the present invention will be described in detail below with reference to the accompanying drawings.

First Embodiment

Figure 1A:
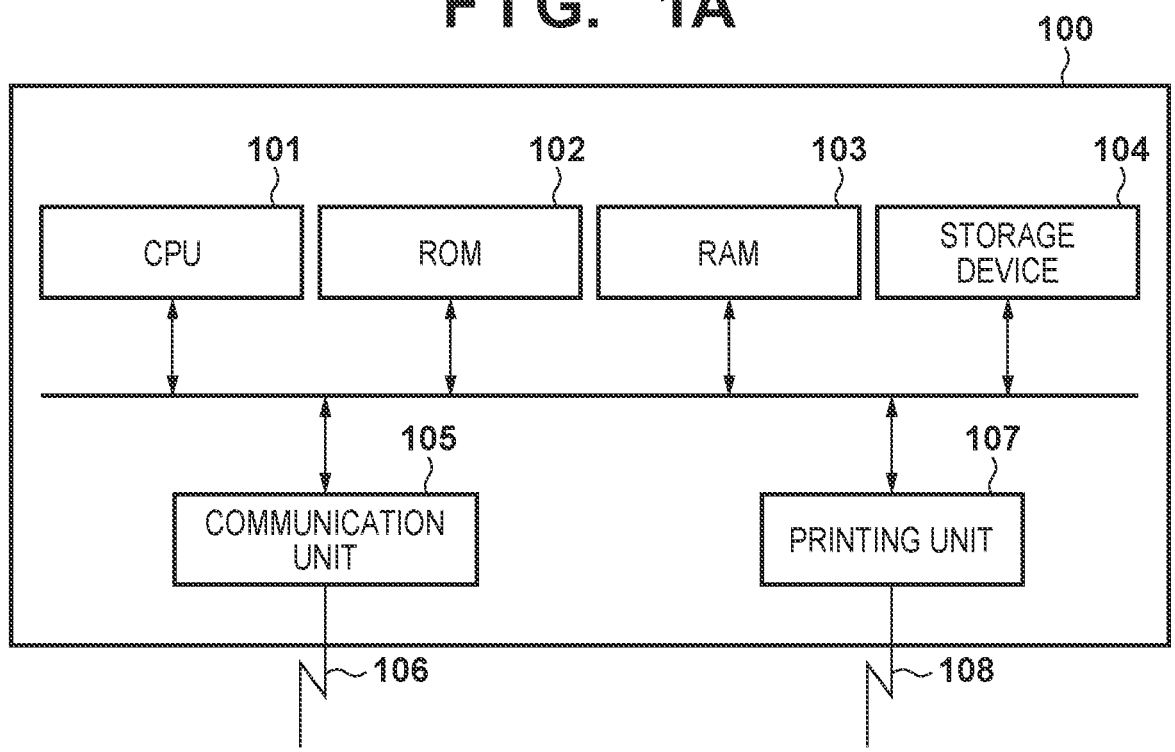
FIGS. 1A and 1B are views schematically showing an image processing system according to an embodiment of the present invention.
Figure 1B:
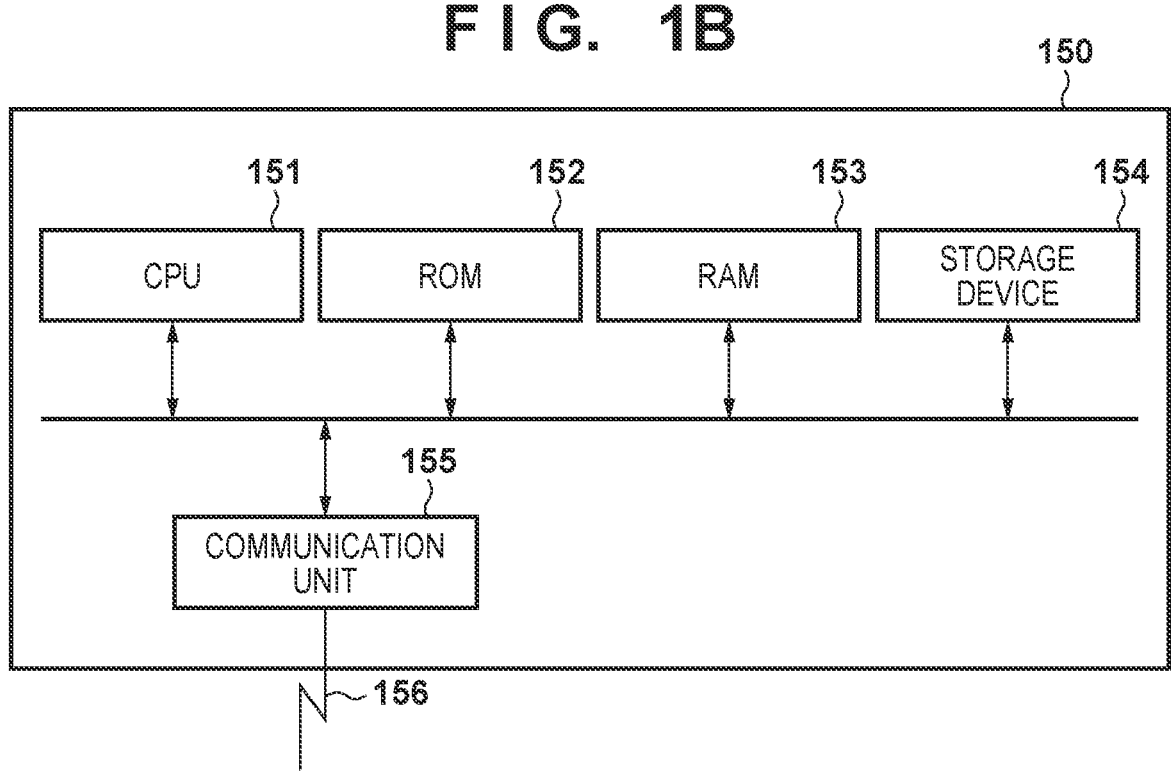

FIGS. 1A and 1B are views schematically showing a first image processing apparatus and a second image processing apparatus according to an embodiment. In this embodiment, assume that an image processing system includes the first image processing apparatus and the second image processing apparatus.

An image processing apparatus 100 shown in FIG. 1A has an image output function and may be, for example, a printer. The image processing apparatus 100 includes a CPU 101, a ROM 102, a RAM 103, a storage device 104, a communication unit 105, and a printing unit 107. Respective components are communicably connected to each other via an internal bus of the image processing apparatus 100. The CPU 101 is a central processing unit that controls the overall image processing apparatus 100 and generally controls the processing sequence of the image processing apparatus 100. The ROM 102 is a nonvolatile storage area. The RAM 103 is a volatile storage area. Programs and permanent data for implementing the flowcharts (to be described later) according to this embodiment are stored in the ROM 102. The RAM 103 is used to temporarily store data and load programs. The storage device 104 is a nonvolatile storage area. The data stored in this storage device can be held even in a power-off state of the image processing apparatus 100, and the stored data can be read out after re-activation of the image processing apparatus 100. The communication unit 105 is used for data transmission/reception with an external device via network 106. In this case, for example, the external device can be an image processing apparatus 150. The printing unit 107 prints an image on a print medium such as paper by using a print head 108.

The image processing apparatus 150 shown in FIG. 1B can be, for example, an information processing apparatus such as a PC. The image processing apparatus 150 includes a CPU 151, a ROM 152, a RAM 153, a storage device 154, and a communication unit 155. Respective components are communicably connected to each other via an internal bus of the image processing apparatus 150. The CPU 151 is a central processing unit that controls the overall image processing apparatus 150 and generally controls the processing sequence of the image processing apparatus 150. The ROM 152 is a nonvolatile storage area. The RAM 153 is a volatile storage area. Programs and permanent data for implementing the flowcharts (to be described later) according to this embodiment are stored in the ROM 152. The RAM 153 is used to temporarily store data and load programs. The storage device 154 is a nonvolatile storage area. The data stored in this storage device can be held even in a power-off state of the image processing apparatus 150, and the stored data can be read out after re-activation of the image processing apparatus 150. The communication unit 155 is used for data transmission/reception with an external device via network 156. In this case, for example, the external device can be an image processing apparatus 100.

Figure 2:
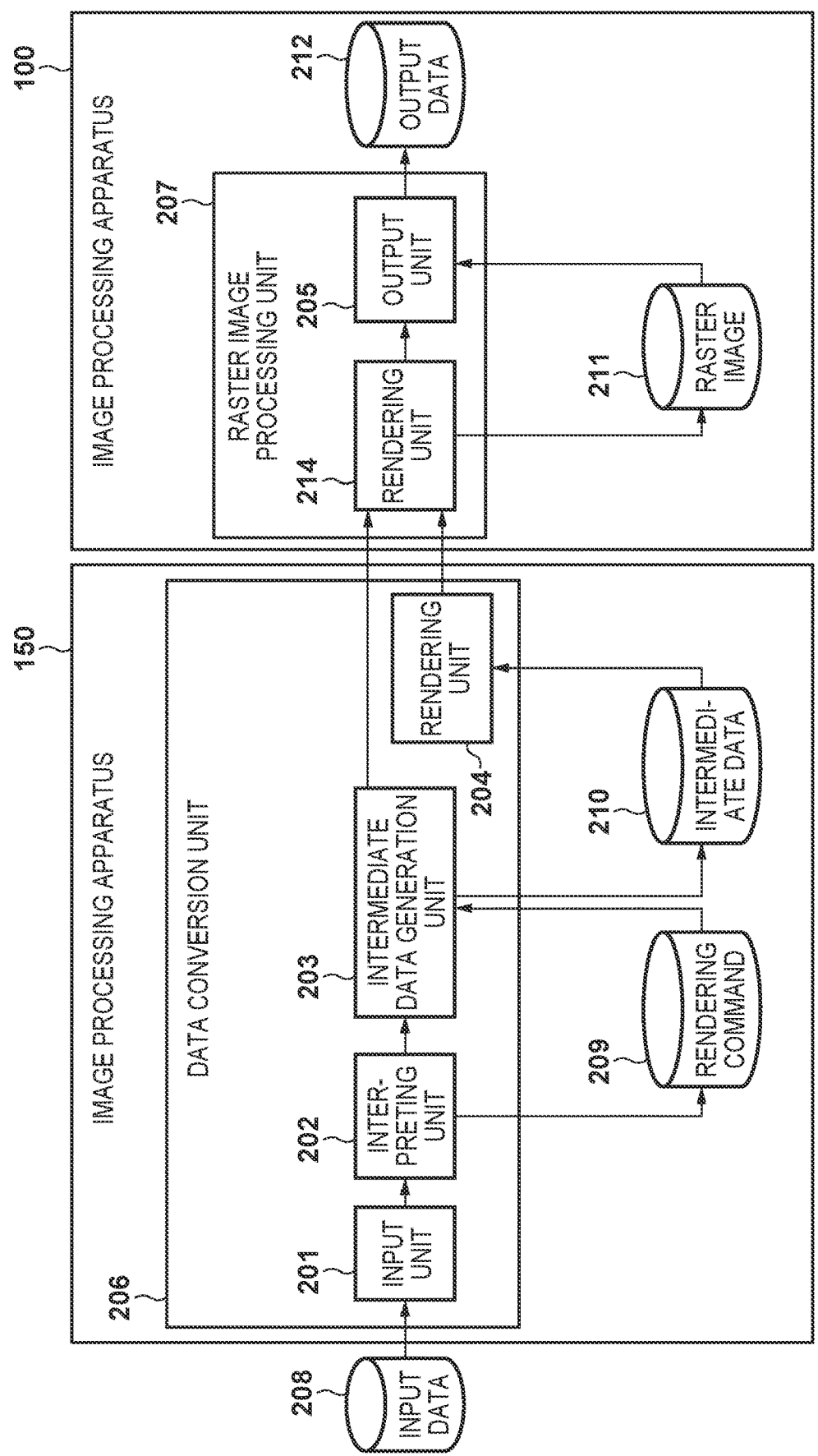
FIG. 2 is a view showing processing functions and data flow of an image processing system according to the first embodiment.

FIG. 2 is a view showing processing functions and a data flow of the image processing system according to this embodiment. Data generated by each processing unit in the image processing system is held in a corresponding storage unit included in the image processing system.

An input unit 201 receives input data 208 from an external apparatus (not shown) connected to the image processing apparatus 150. An interpreting unit 202 interprets the input data 208 received by the input unit 201 and extracts a rendering command 209. The input data 208 according to this embodiment is image data described by a PDL (Page Description Language). The format of the input data 208 can be a known format such as a PDF (Portable Document Format) or an OpenXPS, and a PDF object or an OpenXPS object can be the rendering command 209. An intermediate data generation unit 203 generates intermediate data 210 in accordance with the rendering command 209 extracted by the interpreting unit 202. A specific description of the intermediate data 210 will be given later.

A rendering unit 204 (to be described in detail later) converts, as needed, the rendering contents of the intermediate data 210 generated by the intermediate data generation unit 203 into image data and updates the intermediate data 210. The update processing of the intermediate data 210 will be referred to as "flattening" hereinafter. Flattening is performed, for example, when the intermediate data 210 exceeds the upper-limit data size of a storage area for spooling the intermediate data. More specifically, flattening is processing of executing, beforehand in the rendering unit 204, at least a part of raster image generation processing that is to be executed in a rendering unit 214. A raster image generated in the rendering unit 204 is handled as image data of the fill information (to be described later).

The rendering unit 214 receives the intermediate data 210 from a data conversion unit 206 and generates a raster image 211 based on the intermediate data 210. Note that if the rendering unit 214 receives intermediate data from the rendering unit 204, that is, receives flattened intermediate data, the rendering unit 214 will extract image data from the intermediate data, load the image on a temporary buffer on the RAM 103, and transfer the image to an output unit 205.

The output unit 205 forms and outputs output data 212 by performing image processing such as halftone processing to the raster image 211 generated by the rendering unit 214.

In this embodiment, the data conversion unit 206 includes the input unit 201, the interpreting unit 202, the intermediate data generation unit 203, and the rendering unit 204. A raster image processing unit 207 includes the rendering unit 214 and the output unit 205. Note that although the arrangement of the devices is not particularly limited, the data conversion unit 206 is implemented by a printer driver and the raster image processing unit 207 is implemented by a printer in this embodiment. That is, the data conversion unit 206 is included in an information processing apparatus such as a PC serving as an external apparatus of a printer, and the raster image processing unit 207 is included in the printer shown in FIG. 1A.

The intermediate data 210 is transmitted, via a LAN (Local Area Network), a USB (Universal Serial Bus) or the like, from the data conversion unit 206 to the raster image processing unit 207. The raster image processing unit 207 outputs the output data 212 by printing on a print medium. Note that the present invention is not limited to this. The data conversion unit 206 and the raster image processing unit 207 may also be included in a single image processing apparatus.

FIG. 3 is a view showing an example of the input data 208. In a rendering region 300, a portion of a rectangular single-color object 301 is superimposed on a portion of an image object 302. The superimposed portion shows a state in which the rectangular single-color object 301 is transparent and superimposed on the upper end of the image object 302.

FIGS. 4A, 4B, and 4C show the state of the intermediate data 210 with respect to the example of the input data 208 of FIG. 3. In this embodiment, the intermediate data 210 includes boundary information, composition information, and fill information.

The boundary information is information indicating the boundary coordinates of each region separated by the superposition of objects and is data that refers to corresponding composition information. In one embodiment, the boundary coordinates are indicated by upper-end and lower-end Y-coordinates (vertical positions) and left-end and right-end X-coordinates (horizontal positions) for each Y-coordinate existing in each region in a page. Note that the Y-coordinates and the X-coordinates are determined so as not to extend over another region. For example, as shown in FIG. 4B, boundary information 400 indicates a coordinate set of a region without an object, in other words, an X-coordinate background region. As shown in FIG. 4C, boundary information 402 indicates a coordinate set of a right-side region of the single-color object 301 and the image object 302. The boundary information 400 and the boundary information 402 correspond to the background region. In addition, boundary information 401 indicates a coordinate set of the region where the single-color object 301 is superimposed on the image object 302.

Fill information is data indicating a color for rendering each object and the like. For example, fill information 406 is information indicating the color to render the single-color object 301 and is RGB values (3-byte data using 1 byte for each of R, G, and B) of a single-color object in one embodiment. Fill information 407 is information indicating a color to render the image object 302 and is image data information arranged by BMP, JPEG, or the like in one embodiment. In addition, fill information 405 is information indicating the color to render the background and is RGB values of the background color.

Composition information is information indicating the fill information to be referred to for each region and indicates a composition processing method when a plurality of pieces of fill information are to be referred to. As described above, the composition information is referred to from the boundary information. The composition processing method is an ROP (Raster Operation) logical operation in one embodiment. For example, the boundary information 400 refers to composition information 403, and the composition information 403 refers to the fill information 405. The boundary information 402 also refers to composition information 403. The boundary information 401 refers to composition information 404, the composition information 404 refers to the fill information 406 and the fill information 407 and indicates that composition processing will be performed by writing over (Over) these pieces of fill information. The boundary information, the composition information, and the fill information are associated in this manner.

Figure 5:
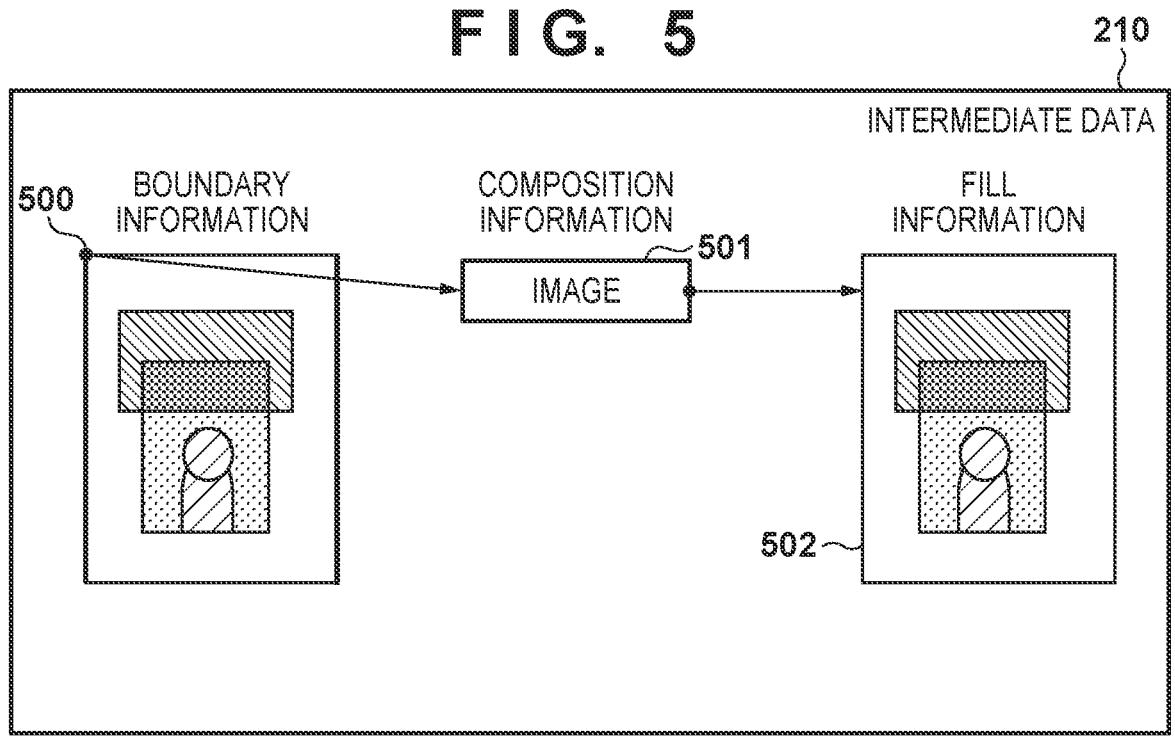
FIG. 5 is a view showing an example of flattening the intermediate data according to the first embodiment.

A description about flattening will be given here. As described above, flattening is processing to convert the rendering contents of the intermediate data 210 into image data and update the intermediate data 210. FIG. 5 shows the state of a case in which the intermediate data 210 of FIG. 4A has been flattened. The intermediate data 210 is converted into one image data by flattening. Additionally, the converted image data is compressed by, for example, a lossy compression method such as JPEG. As a result, the data size of the image data is reduced. As a plurality of image data are converted into one image data, the plurality of pieces of fill information 405 to 407 of FIG. 4A are changed into one piece of fill information 502. In addition, boundary information 500 having the entire rendering region 300 as a single region and composition information 501 are generated. In this manner, flattening allows the size of the fill information to be reduced compared to that before flattening. The boundary information 500 refers to the composition information 501, and the composition information 501 refers to the fill information 502. In one embodiment, pieces of information other than the boundary information 500, the composition information 501, and the fill information 502 are deleted from the intermediate data 210 to reduce the data size.

Figure 6:
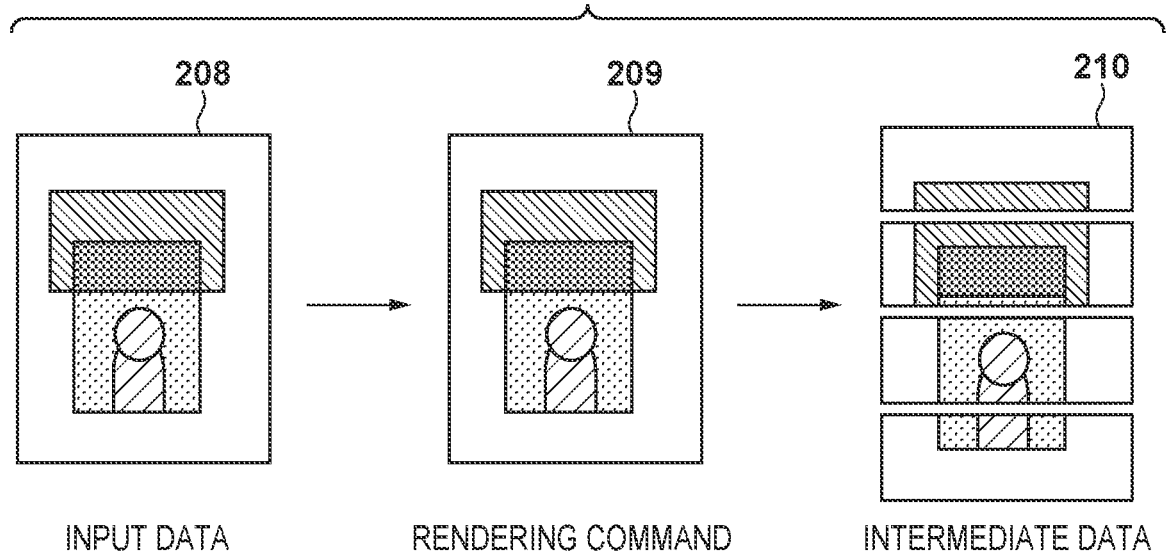
FIG. 6 is a view showing how the intermediate data is generated for each band according to the first embodiment.

The intermediate data 210 of each band will be described next. When the intermediate data 210 is to be generated in accordance with the rendering command 209, the intermediate data 210 is divided and generated for each band following the output order (from the top to bottom of the page) of the output unit 205. FIG. 6 shows the state in which the intermediate data 210 is generated for each band. The input data 208 and the rendering command 209 each are data for each page, and the intermediate data 210 is data for each band. In the example of FIG. 6, the intermediate data 210 is divided into 4 bands, and each band has a data configuration that is configured from the aforementioned boundary information, the composition information, and the fill information.

In one embodiment, assume that the height per one band is a predetermined number of scan lines based on the ability of the data conversion unit 206 to transfer or spool the intermediate data 210. For example, if the data communication band of the printer driver and the printer is narrow, the maximum bandwidth per one page can be made small so the transferring of the intermediate data 210 is not a bottleneck for the entire process. In addition, for example, if the upper limit data size of the intermediate data 210 is small, the maximum bandwidth for one page can be made small so as to prevent extreme flattening from occurring. Note that the last bandwidth may have a fraction. Furthermore, if the input page height is smaller than the predetermined height, the intermediate data 210 is generated by one band. When the intermediate data is generated by one band, one intermediate data 210 is generated for the rendering region 300 as shown in the respective examples of FIGS. 4A to 4C and FIG. 5.

Figure 7:
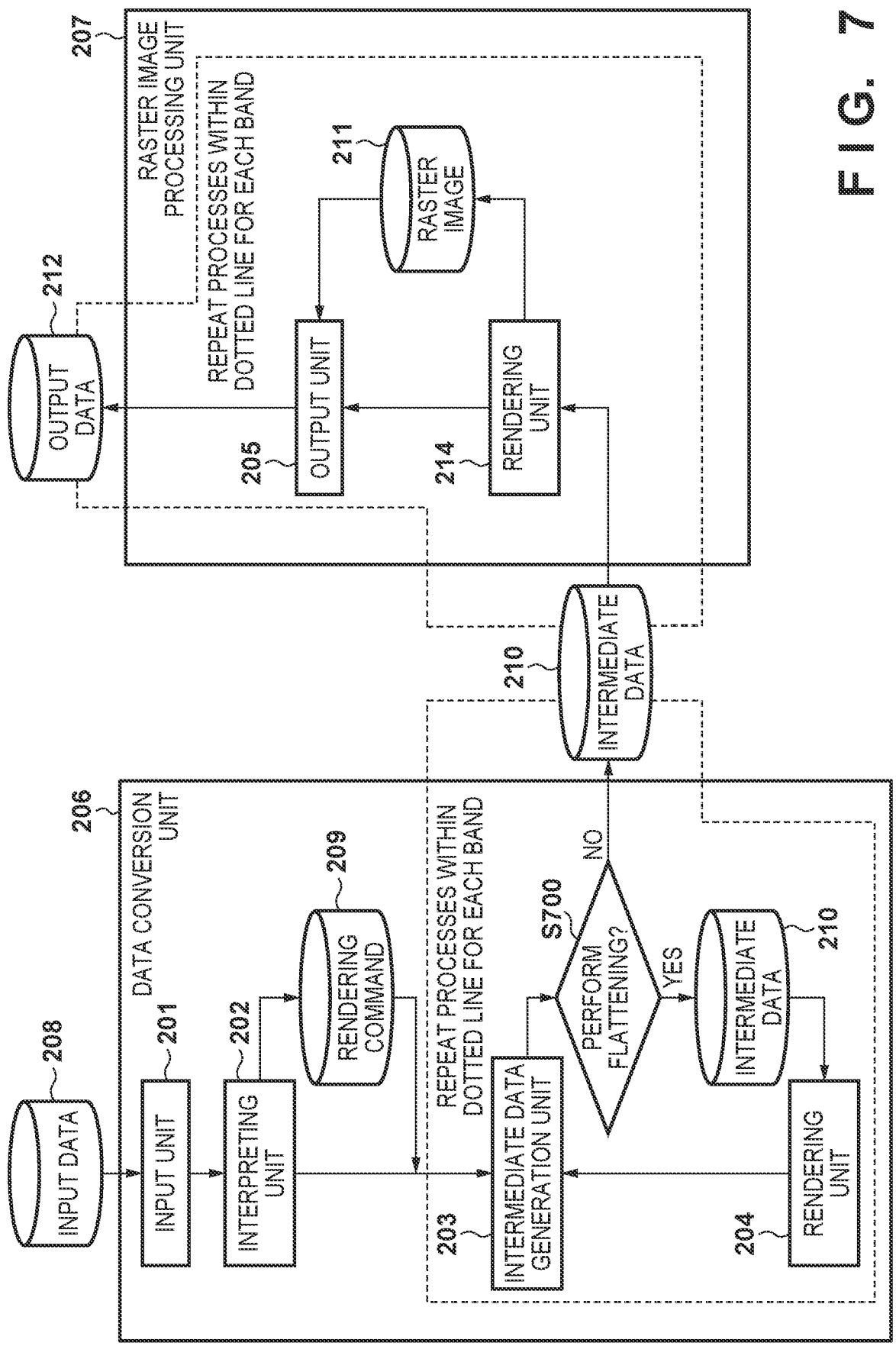
FIG. 7 is a view showing a data flow according to the first embodiment.

FIG. 7 shows the data flow in which the intermediate data 210 for each band is generated and rendered to output the raster image 211. In FIG. 7, it is expressed that the same processing is repeated for each band within each dotted line frame. The input unit 201 receives input data 208 of each page, and the interpreting unit 202 interprets the PDL data and extracts the rendering command 209 for each page. The intermediate data generation unit 203 generates, from the rendering command 209, the intermediate data 210 sequentially from the start band. At this time, whether to perform flattening of the intermediate data 210 of the band is determined (step S700). Details of the determination method will be described later. If it is determined that flattening is to be performed (YES in step S700), the intermediate data 210 of the band of interest is transmitted to the rendering unit 204 in the data conversion unit 206. The rendering unit 204 converts and compresses the intermediate data 210 of the band of interest into image data, and the intermediate data generation unit 203 updates the intermediate data 210. Otherwise (NO in step S700), the intermediate data 210 of the band is transferred from the data conversion unit 206 to the raster image processing unit 207. Note that for the intermediate data which has already been flattened, it will be determined not to perform flattening. Subsequently, for the next band, the intermediate data generation unit 203 will repeat the same process to generate the intermediate data 210 for each band. Note that in the data conversion unit 206, there is a storage area enough to store the intermediate data 210 of a plurality of bands, and if the transfer processing has been offloaded, the generation of the intermediate data 210 of the next band may be started before the transfer is completed. When the transfer of the intermediate data 210 for each band is completed for all of the bands, the processing of the data conversion unit 206 is ended.

On the other hand, the rendering unit 214 in the raster image processing unit 207 performs rendering and generates the raster image 211 for each band immediately upon receiving the intermediate data 210 for each band transferred from the data conversion unit 206. The output unit 205 then performs image processing such as halftone processing, forms the output data 212 for each band as soon as the raster image 211 is generated, and outputs the generated output data. The rendering unit 214 and the output unit 205 in the raster image processing unit 207 repeat the processes for each band. When the output of the output data 212 for each band is completed for all of the bands, the processing of the data conversion unit 206 is ended.

A description of a more detailed flowchart concerning the data conversion unit 206 and the raster image processing unit 207 will be given later.

As a result of the above-described series of processes, rendering and output processing need not be kept on hold until the generation of the intermediate data 210 for the entire page is completed, thereby improving the processing performance of the overall system.

Figure 8:
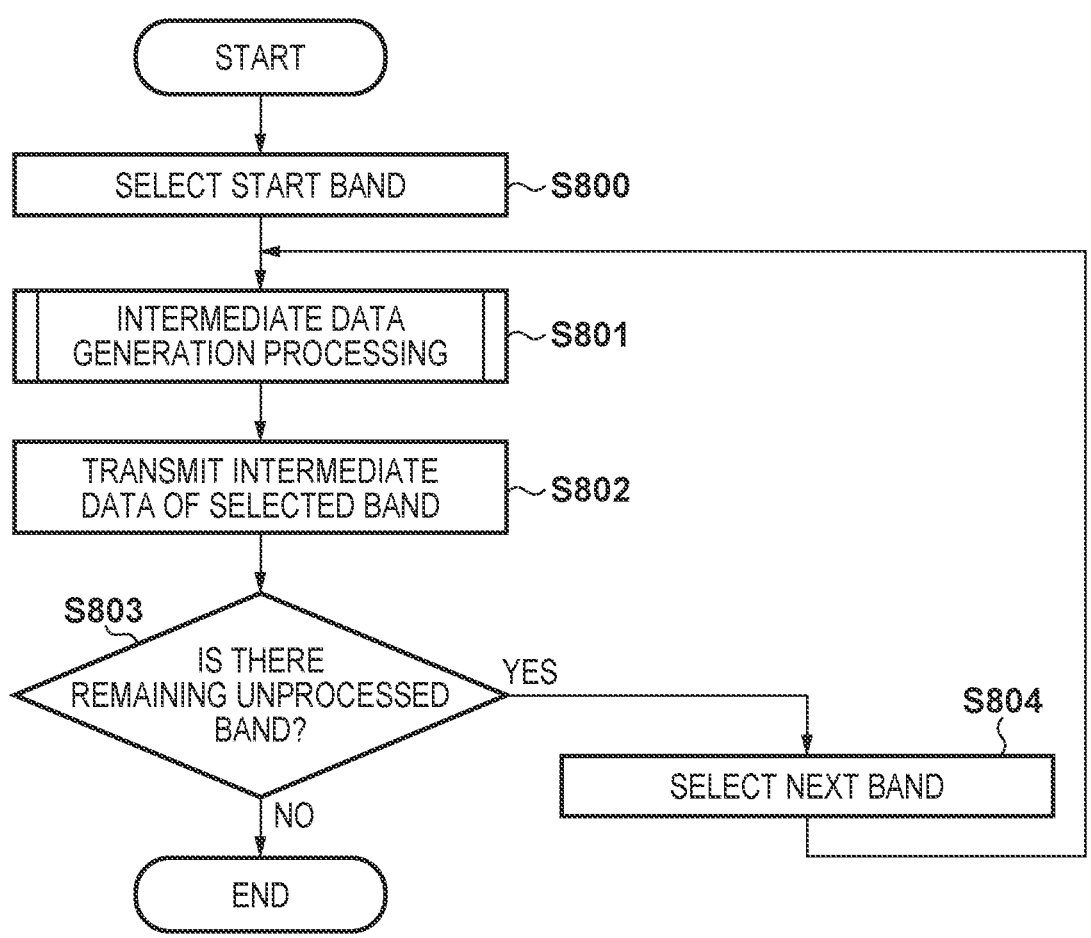
FIG. 8 is an overall flowchart of intermediate data generation processing according to the first embodiment.

FIG. 8 shows a flowchart in which the data conversion unit 206 generates the intermediate data 210 for each band and transmits the generated data to the raster image processing unit 207 according to this embodiment. The flowchart of FIG. 8 is performed by the CPU 101 loading an image processing program stored in the ROM 102 to the RAM 103 and executing the program.

In step S800, the data conversion unit 206 selects the start band (the first band of the divided bands).

In step S801, the data conversion unit 206 generates the intermediate data 210 of the selected band. A description of the detailed flowchart of the intermediate data generation processing will be given later with reference to FIG. 10.

In step S802, the data conversion unit 206 transmits the generated intermediate data 210 to the raster image processing unit 207.

In step S803, the data conversion unit 206 determines whether an unprocessed band remains. If an unprocessed band remains (YES in step S803), the process advances to step S804. Otherwise (NO in step S803), the main processing sequence is ended.

In step S804, the data conversion unit 206 selects the unprocessed band and returns to step S801 to repeat the processing.

Figure 9:
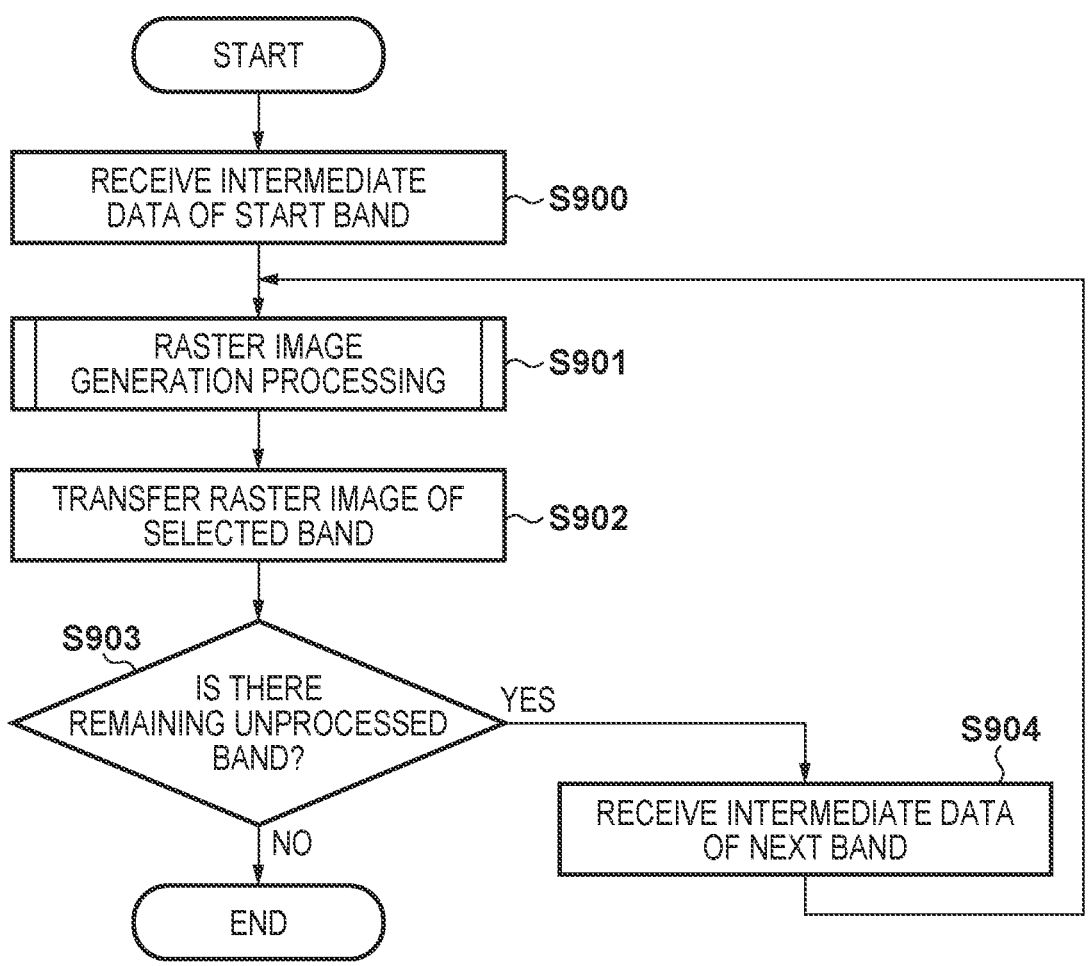
FIG. 9 is an overall flowchart of raster image generation processing according to the first embodiment.

FIG. 9 shows a flowchart in which the raster image processing unit 207 receives the intermediate data 210 for each band, generates the raster image 211, and transfers the generated image to the output unit 205. The flowchart of FIG. 9 is performed by the CPU 151 loading an image processing program stored in the ROM 152 to the RAM 153 and executing the program.

In step S900, the raster image processing unit 207 receives the intermediate data 210 of the start band.

In step S901, the raster image processing unit 207 generates the raster image 211 of the received band. A description of the detailed flowchart of the raster image generation processing will be given later with reference to FIG. 12.

In step S902, the raster image processing unit 207 transfers the generated raster image 211 to the output unit 205. In one embodiment, this transfer is not a simple data copy but performed by performing halftone processing by the output unit 205.

In step S903, the raster image processing unit 207 determines whether an unprocessed band remains. If an unprocessed band remains (YES in step S903), the process advances to step S904. Otherwise (NO in step S903), the main processing sequence is ended.

In step S904, the raster image processing unit 207 receives the intermediate data of the unprocessed band and returns to step S901 to repeat the processing.

Figure 10:
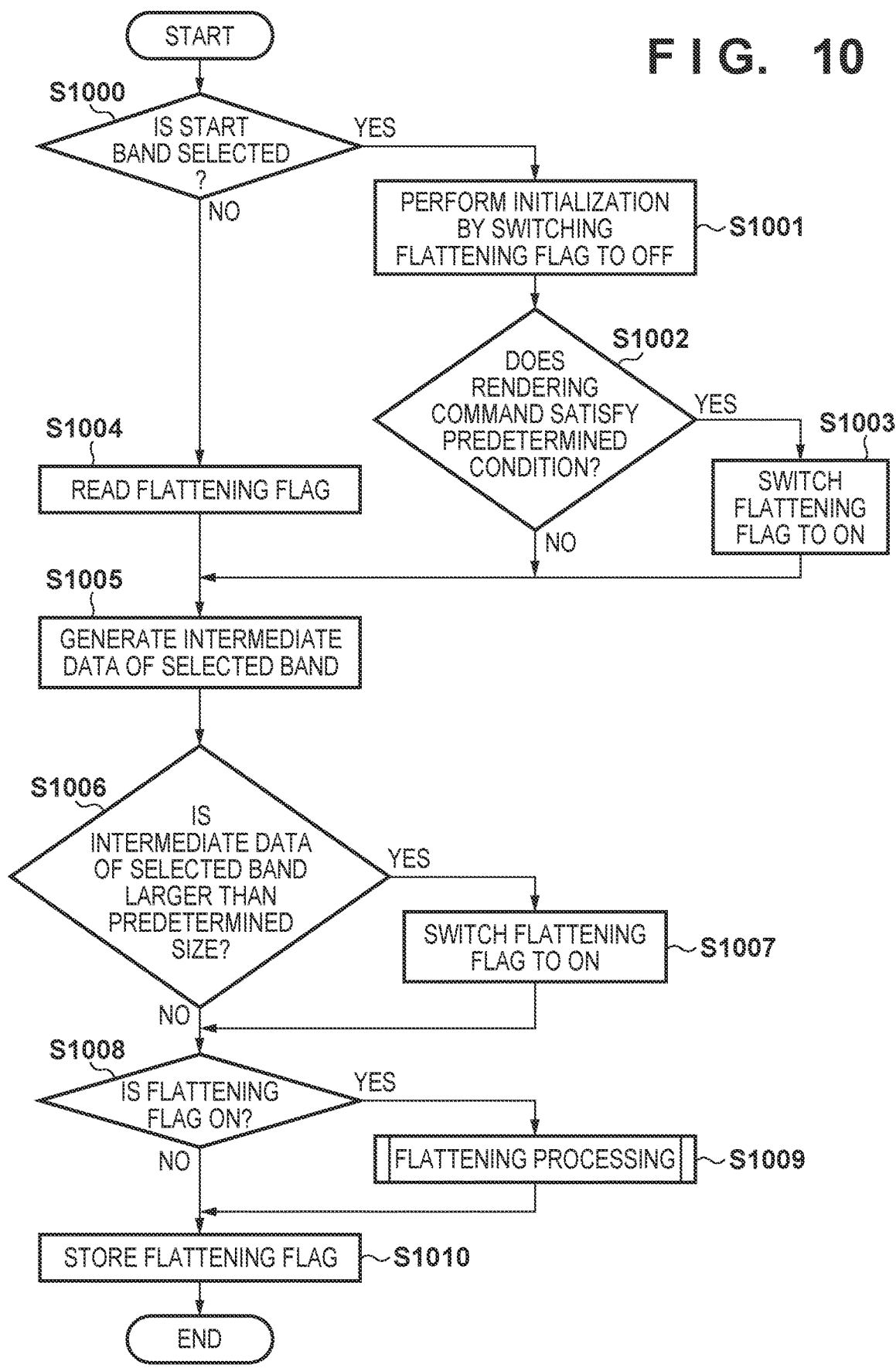
FIG. 10 is a flowchart of the intermediate data generation processing according to the first embodiment.

FIG. 10 shows a detailed flowchart of the intermediate data generation processing in step S801 of FIG. 8. In this flowchart, before the intermediate data 210 of the start band is generated, whether to perform flattening on the intermediate data 210 of all of the bands is determined according to whether the rendering command 209 satisfies a predetermined condition. The background of this configuration is that if only some of the bands are flattened, the boundary lines will become noticeable due to image quality difference between bands that have undergone lossy compression and those that have not, and the visual quality will problematically degrade. On the other hand, if the intermediate data 210 of all of the bands are constantly flattened, extra processing load due to flattening will be put even on a page with few rendering contents. Furthermore, even if the intermediate data 210 is to be flattened for all of the bands at the stage when a band requiring flattening is detected, the band on the side of the head of the page may already have been output at that point. In order to suppress the above-described problems, whether to perform flattening on the intermediate data 210 of all of the bands will be determined based on the rendering command 209 in this embodiment.

The predetermined condition to be used here is whether the total data size of the image object in the rendering command 209 is equal to or more than a predetermined threshold. The reason for setting such a feature shown in this condition as the determination reference is because the fill information for rendering the image object is image data. Hence, compared to the single-color RGB values and the boundary coordinates, the fill information tends to have a large data size. Particularly, in the generation of the intermediate data 210 for each band, if the image object is extending over a plurality of bands, this fill information is included in the intermediate data 210 of every band over which the image object extends. Thus, in a mode in which the intermediate data 210 is to be generated for each band, the total data size of the image object influences the data size of the intermediate data 210 and may be its predictive criterion. As an example, assume that the total data size of the image object in the rendering command 209 is equal to or more than the upper limit data size (equal to or more than a size threshold) of the intermediate data 210. In this example, the size threshold is set assuming a situation in which a vertically long strip image object is arranged so as to extend over all of the bands. Therefore, if the total data size of the image object in the rendering command 209 is equal to or more than the size threshold of the intermediate data 210, flattening is performed on the side of the printer driver, that is, in the data conversion unit 206.

As another condition, assume that the number of specific objects in the rendering command 209 is equal to or more than a preset threshold. As an example, assume a situation in which a large number of image objects having an orientation different from that of a page (orientation of the printing direction) are present in the page, and that a situation in which 10,000 or more of such image objects are present is set as a condition. In other words, whether the number of image objects including an image rotation instruction as a rendering command within a page is equal to or more than a threshold is set as a condition. The background of this configuration is that the processing load of image data rotation processing tends to be heavy, and it is preferable to perform this processing on the side of the printer driver on a PC, which has a higher processing performance, than on the side of the printer. Hence, if there are a large number of image objects having an orientation different than that of the page, flattening is performed on the side of the printer driver, that is, in the data conversion unit 206. Since the image data is rotated in accordance with the orientation of the page simultaneously upon image data conversion by this configuration, the processing performance of the overall system can be improved. Similarly, as the decoding processing of the image data also has a heavy processing load, a situation in which 10,000 or more of such image objects are present may be set as a condition. This will allow a large number of image objects to be flattened into one image data without superposition, thereby reducing the decoding processing load on the side of the printer and improving the processing performance of the overall system.

In this embodiment, execution of flattening is determined if at least one of the condition of the total data size of the image objects in the aforementioned rendering command 209 and the condition of the number of specific image objects in the aforementioned rendering command 209 is satisfied.

Note that the conditions to be used as predetermined conditions according to this embodiment are not limited to those described above. Other conditions may be used in consideration of the processing loads of the printer driver and the printer, respectively. For example, flattening may be performed regardless of the orientation of the image object if the number of image objects is equal to or more than a preset threshold. Also, for example, a condition may be determined from the data transfer rate, the storage area size, or from the relationships between other processes performed in each image processing apparatus. Each threshold need not always be a fixed value and may be changed in accordance with the state of each image processing apparatus.

The steps of FIG. 10 will be described. The flowchart of FIG. 10 is performed by the CPU 101 loading an image processing program stored in the ROM 102 to the RAM 103 and executing the program.

In step S1000, the data conversion unit 206 determines whether the start band is currently selected. If the start band is currently selected (YES in step S1000), the process advances to step S1001. If a band other than the start band is selected (NO in step S1000), the process advances to step S1004.

In step S1001, the data conversion unit 206 performs initialization by switching the flattening flag provided in the RAM 153 to OFF. The flattening flag is a binary variable to temporarily store a determination as to whether flattening is to be performed or not. ON indicates that flattening is to be performed and OFF indicates that flattening is not to be performed. The process advances to step S1002 after initialization.

In step S1002, the data conversion unit 206 determines whether the rendering command 209 satisfies a predetermined condition. Here, the predetermined condition corresponds to the condition described above. This determination is a process to estimate whether the entire size of the target intermediate data is large. If the predetermined condition is satisfied, it is estimated that the entire size of the target image data is large. If the predetermined condition is satisfied (YES in step S1002), the process advances to step S1003. Otherwise (NO in step S1002), the process advances to step S1005.

In step S1003, the data conversion unit 206 switches the flattening flag to ON. The process then advances to step S1005.

In step S1004, the data conversion unit 206 reads the value of the flattening flag which was used until the immediately preceding band. That is, the flattening flag value that was used in the immediately preceding band is transferred in this case. Note that the storage processing for transferring the flattening flag between bands will be described later.

In step S1005, the data conversion unit 206 generates the intermediate data of the selected band (processing target band).

In step S1006, the data conversion unit 206 determines whether the data size of the intermediate data of the generated band is larger than a predetermined size. In one embodiment, the predetermined size is the upper-limit size in which it is possible to spool the intermediate data 210 of each band in the raster image processing unit 207. If the data size of the intermediate data is larger than the predetermined size (YES in step S1006), the process advances to step S1007. If the data size is equal to or less than the predetermined size (NO in step S1006), the process advances to step S1008. The data size of the intermediate data is the total data size of the size of the image data itself, the size of the fill information for each page, and the size of the edge information for each band. Note that other than the start band, this determination determines whether the size of the intermediate data in each subsequent band is larger than the predetermined size. Hence, in this embodiment, if the size of the intermediate data of a given band is determined to be larger than the predetermined size, all of the bands subsequent to this band will be handled as flattening target bands. Note that if the flattening flag has already been switched to ON, the process may advance from step S1005 to step S1008 without performing the determination of step S1006.

In step S1007, the data conversion unit 206 switches the flattening flag to ON. The process advances to step S1008.

In step S1008, the data conversion unit 206 determines whether the flattening flag is ON. If the flattening flag is ON (YES in step S1008), the process advances to step S1009. Otherwise (NO in step S1008), the process advances to step S1010.

In step S1009, the data conversion unit 206 flattens the selected band. A description of the detailed flowchart of the flattening processing will be given later with reference to FIG. 11. After the flattening processing, the process advances to step S1010.

In step S1010, the data conversion unit 206 stores the flattening flag. Then, the main processing sequence ends. Note that the flattening flag stored here is read in the step of step S1004 when the next band is selected. When the next band is to be processed, the same processing shown in FIG. 10 is executed again.

Figure 11:
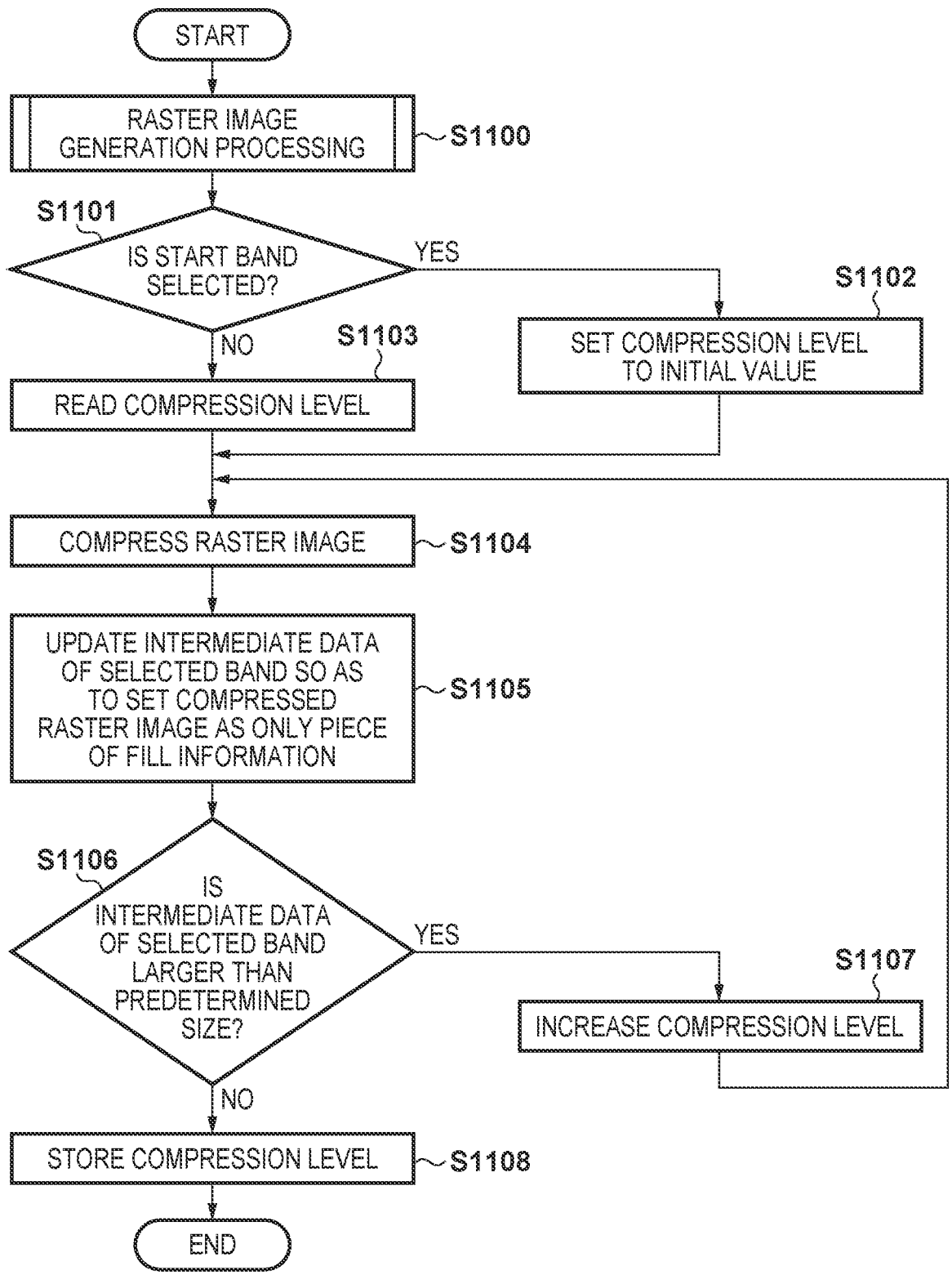
FIG. 11 is a flowchart of flattening processing according to the first embodiment.

FIG. 11 is a flowchart showing the detailed sequence of the flattening processing of step S1009 in FIG. 10.

In step S1100, the data conversion unit 206 generates a raster image of the selected band. A description of the detailed flowchart of the raster image generation processing will be given with reference to FIG. 12.

In step S1101, the data conversion unit 206 determines whether the start band is selected. If the start band is selected (YES in step S1101), the process advances to step S1102. If a band other than the start band is selected (NO in step S1101), the process advances to step S1103.

In step S1102, the data conversion unit 206 sets the compression level to the initial value. Then, the process advances to step S1104. The compression level is a compression level to compress the generated raster image and is represented by a quantization factor if, for example, the compression method is JPEG. If the compression method is another method, the level (degree) of compression according to that method is used. The initial value of the compression level may be determined in accordance with the load or the like of the compression processing.

In step S1103, the data conversion unit 206 reads the information of the compression level which has been used until the immediately preceding band. Then, the process advances to step S1104. Note that the process to store the compression level in order to transfer the compression level between bands will be described later.

In step S1104, the data conversion unit 206 compresses the generated raster image using the set compression level or the read compression level.

In step S1105, the data conversion unit 206 updates the intermediate data 210 of the selected band so as to set the compressed raster image as the only piece of fill information. The state of the updated intermediate data 210 compared to the source intermediate data 210 is same as that described in FIG. 5.

In step S1106, the data conversion unit 206 determines whether the updated intermediate data 210 is larger than a predetermined size. The predetermined size is the same as the predetermined size used in step S1006 of FIG. 10. If the updated intermediate data is larger than the predetermined size (YES in step S1106), the process advances to step S1107. If it is equal to or less than the predetermined size (NO in step S1106), the process advances to step S1108.

In step S1107, the data conversion unit 206 increases the compression level and performs raster image compression again by returning to step S1104. Note that the compression level may be increased for each stage (for example, in the case of JPEG, the quantization factor can be increased per 1%) or the width to be increased may be determined in accordance with the difference between the predetermined size and the updated intermediate data 210.

In step S1108, the data conversion unit 206 stores the compression level used in the selected band. Then the main processing sequence ends. Note that the information of the stored compression level is read in step S1103 when the next band is selected. Note that if the intermediate data of the selected band is not larger than the predetermined size, the process may end without compressing the raster image.

Figure 12:
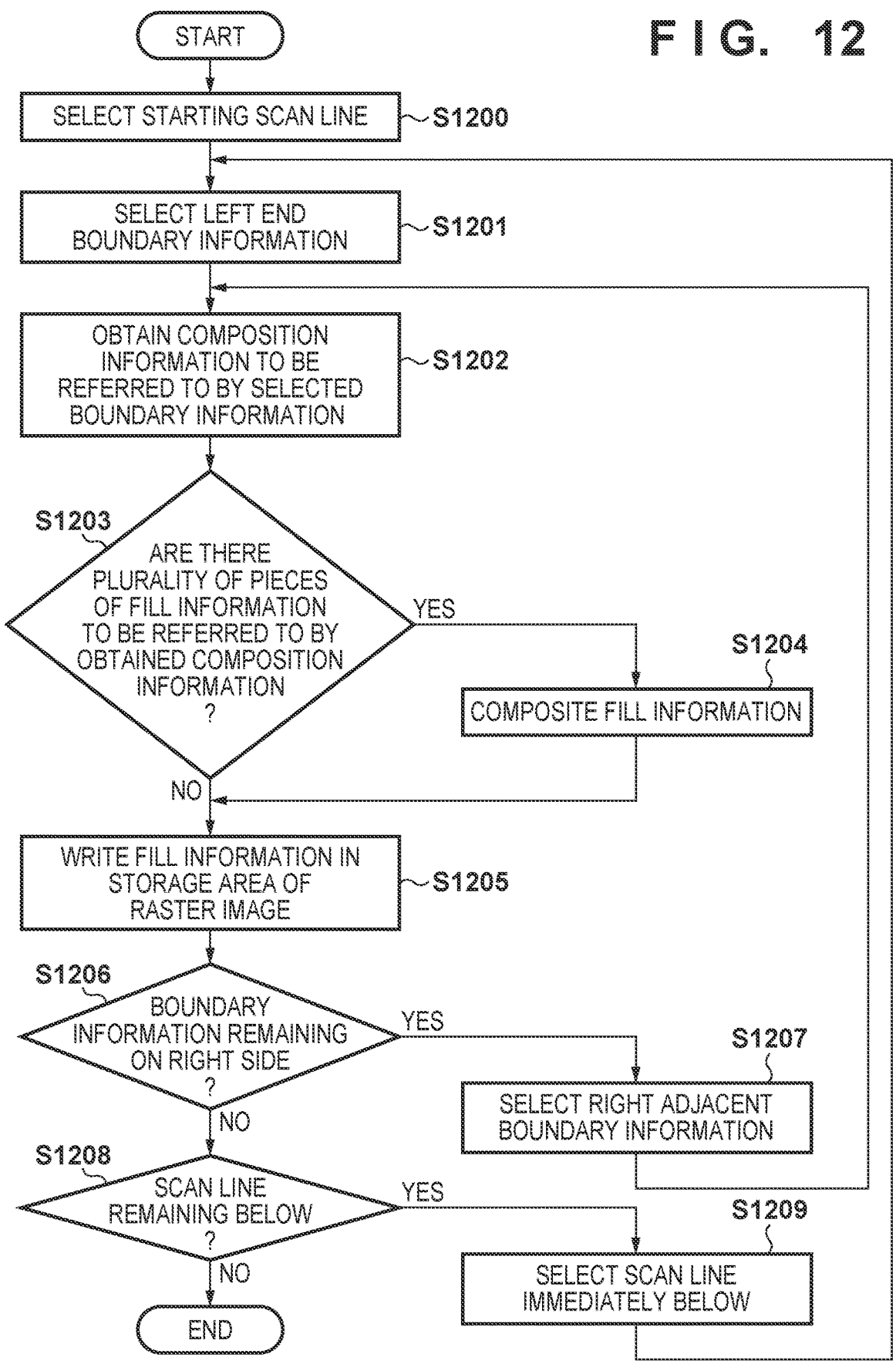
FIG. 12 is a flowchart of the raster image generation processing according to the first embodiment.

FIG. 12 shows a detailed flowchart of the raster image generation processing in step S901 of FIG. 9 and step S1100 of FIG. 11.

In step S1200, the data conversion unit 206 selects the start scan line from the intermediate data 210.

In step S1201, the data conversion unit 206 selects the boundary information on the leftmost side of the selected scan line.

In step S1202, the data conversion unit 206 obtains the composition information to be referred to by the boundary information selected in step S1201.

In step S1203, the data conversion unit 206 determines whether a plurality of pieces of the composition information have been obtained in step S1202. If there are a plurality of pieces of fill information to be referred to (YES in step S1203), the process advances to step S1204. If there is only one piece of fill information to be referred to (NO in step S1203), the process advances to step S1205.

In step S1204, the data conversion unit 206 composites the fill information into one piece of fill information. The process then advances to step S1205.

Figure 13A:
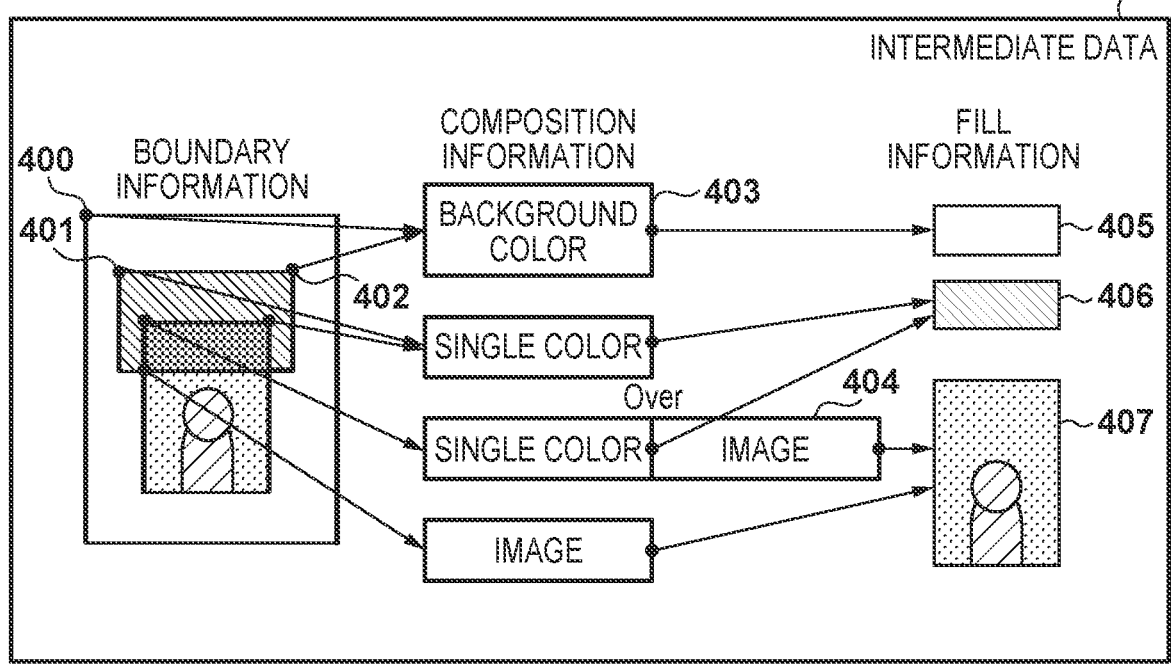
FIGS. 13A and 13B are views showing how pieces of fill information are composited according to the first embodiment.
Figure 13B:
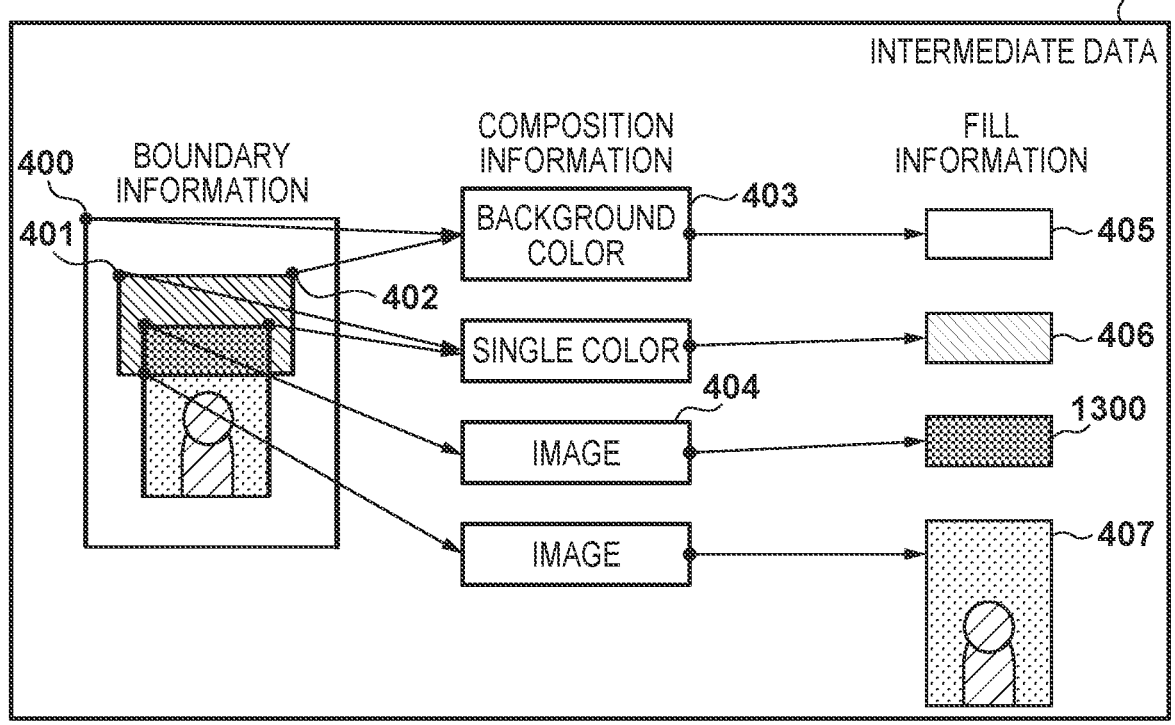

FIGS. 13A and 13B are views each showing the state of fill information composition. FIG. 13A shows a state before composition. FIG. 13A shows that the composition information 404 refers to the fill information 406 and the fill information 407 and performs composition processing by writing over (Over) these pieces of information. FIG. 13B shows a state after composition of the intermediate data 210 shown in FIG. 13A. In FIG. 13B, the fill information 406 and the fill information 407 undergo composition processing, and image data 1300 as a processing result is added as the new fill information. By completing the composition processing in this manner, the fill information referred to by the composition information is compiled into one piece of information.

In step S1205, the data conversion unit 206 writes the fill information in the storage area of the raster image 211. Here, the storage area is an area corresponding to the selected scan line (Y-coordinates) and the range (from the left end to the right end of the X-coordinates) of the selected boundary information. Here, for example, if the fill information is single-color RGB values, the write operation is performed by copying these values to the storage area. Also, if the fill information is image data, the image data can be enlarged or reduced to the same resolution as the raster image 211 with respect to the storage area. If the image data has undergone image compression, image rasterization toward this image data will be performed before enlarging or reducing the image data.

In step S1206, the data conversion unit 206 determines whether another piece of boundary information remains on the right side of the selected boundary information. If another piece of boundary information remains (YES in step S1206), the process advances to step S1207. Otherwise (NO in step S1206), the process advances to step S1208.

In step S1207, the data conversion unit 206 newly selects the boundary information on the right side, and the process returns to step S1202 to repeat the processing.

In step S1208, the data conversion unit 206 determines whether another scan line remains below the selected scan line. If another scan line remains (YES in step S1208), the process advances to step S1209. Otherwise (NO in step S1208), the main processing sequence ends.

In step S1209, the data conversion unit 206 newly selects the scan line which is immediately below. The process returns to step S1201, and the process is repeated.

As described above, in this embodiment, whether image data conversion and image compression are to be performed to the intermediate data of each band is determined in advance in accordance with the feature of the rendering command. This configuration can suppress degradation of visual quality due to a noticeable boundary line caused by an image quality difference between a band that has undergone lossy compression and a band that has not. Also, compared to a case in which the intermediate data is compressed regardless of the necessity of compression, the processing load of flattening can be reduced, and a raster image can be generated efficiently.

In addition, in this embodiment, if the intermediate data of a given band is determined to be larger than the predetermined size, this band and subsequent bands are all handled as flattening targets. For example, a case in which an image object is arranged in the middle of the page may correspond to this. In this case, since it increases the possibility that a band arranged with at least a part of the image object will be flattened, the generation of image quality difference in the image object can be suppressed in a case in which the image object is arranged extending over bands.

Second Embodiment

The first embodiment has described an embodiment in which the flattening flag is switched in accordance with the feature of the rendering command 209. As the second embodiment, an embodiment in which a flattening flag is switched in accordance with the feature of intermediate data 210 of the first band will be described. Note that a description of the same arrangements as those of the first embodiment will be omitted.

Figure 14:
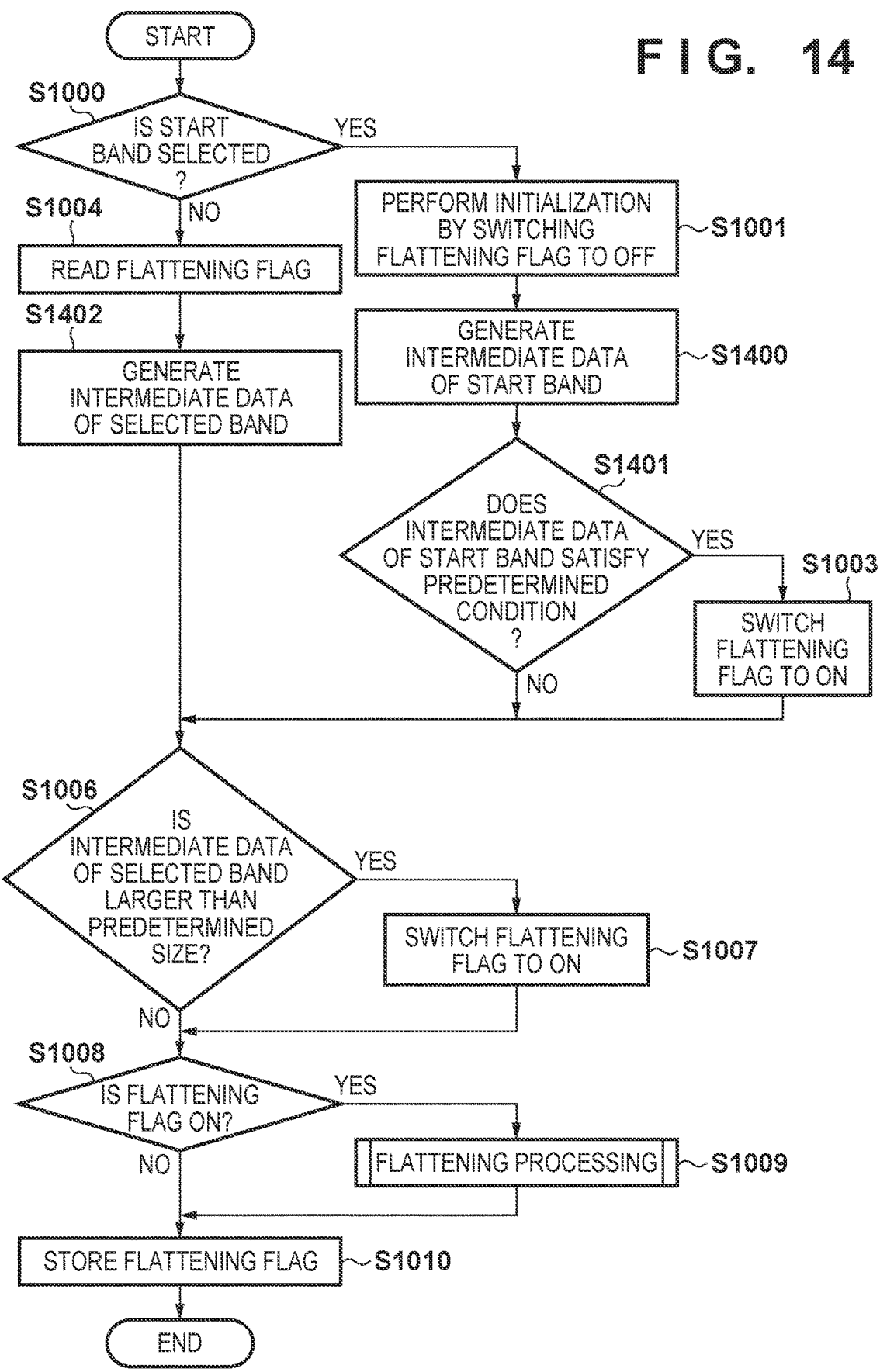
FIG. 14 is a flowchart showing intermediate data generation processing according to the second embodiment.

FIG. 14 shows a flowchart of intermediate data generation processing according to the first embodiment. FIG. 14 corresponds to FIG. 10 described in the first embodiment. Note that in FIG. 14, excluding steps S1400 to S1402, the sequence of the processes is the same as that of the configuration described in FIG. 10, and the same reference symbol will denote the same process.

In step S1000, a data conversion unit 206 determines whether a start band is selected. If the start band is selected (YES in step S1000), the process advances to step S1001. If a band other than the start band is selected (NO in step S1000), the process advances to step S1004.

In step S1001, the data conversion unit 206 performs initialization by switching the flattening flag to OFF.

In step S1400, the data conversion unit 206 generates the intermediate data 210 of the start band.

In step S1401, the data conversion unit 206 determines whether the intermediate data 210 of the start band satisfies a predetermined condition. If the predetermined condition is satisfied (YES in step S1401), the process advances to step S1003. Otherwise (NO in step S1401), the process advances to step S1006.

Here, the predetermined condition is set assuming that the data size of the intermediate data 210 of the start band is larger than a ratio preset with respect to the predetermined size of step S1006. That is, if the intermediate data 210 of the start band is large to a certain degree, the intermediate data 210 of each subsequent band will be larger than a predetermined size, and it is estimated that the possibility that the flattening flag will be switched to ON in step S1007 is high. As an example, the data size of the intermediate data 210 is estimated to have a fluctuation of more or less than 20% depending on the band, and a state in which the data size of the intermediate data 210 of the start band is larger than 80% of the predetermined size in step S1006 is set as the condition. In this manner, in accordance with the feature of the intermediate data 210 of the start band, whether to flatten the intermediate data 210 of each band is determined before transmitting the intermediate data of the first band.

As another condition, a state in which the data size excluding the fill information for rendering the image object, of the intermediate data 210 of the start band, is larger than a ratio preset with respect to the predetermined size of step S1006 can be set as the predetermined condition. Hence, if the data size is large even when excluding image data concerning the fill information, it can be estimated that the possibility that the flattening flag will be switched to ON for each subsequent band due to a complex rendering command 209 is high.

In step S1004, the data conversion unit 206 reads the flattening flag which has been used until the immediately preceding band. Next, in step S1402, the data conversion unit 206 generates the intermediate data 210 of the selected band, and the process advances to step S1006. Processes after step S1006 are the same as those described in FIG. 10 of the first embodiment.

As described above, according to this embodiment, whether to perform image data conversion and image compression to the intermediate data of each band is determined in advance in accordance with the intermediate data of the start band. This configuration can suppress degradation of visual quality due to a noticeable border line caused by an image quality difference between a band that has undergone lossy compression and a band that has not. Also, compared to a case in which the intermediate data is compressed regardless of the necessity of compression, the processing load of flattening can be reduced, and a raster image can be generated efficiently.

In addition, in this embodiment, in the same manner as the first embodiment, if the intermediate data of a given band is determined to be larger than a predetermined size, this band and subsequent bands are handled has flattening targets. Hence, since it increases the possibility that flattening can be started from a band in which at least a part of the image object is arranged, the generation of image quality difference in an image object when the image object is arranged to extend over bands can be suppressed.

In the aforementioned first and second embodiments, the input data 208 is for each page, and the intermediate data 210 is generated for each rendering region of each band in a page. However, in another embodiment, the input data 208 may be for each document, and the intermediate data 210 may be generated for each rendering region of each page in a document. This embodiment can suppress the occurrence of image quality difference between pages. The intermediate data 210 may also be generated for each tile obtained by dividing the X direction (horizontal direction in FIG. 6) and the Y direction into a plurality of tiles. In other words, this embodiment is applicable when the intermediate data 210 is to be processed by dividing the data on a predetermined basis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-086578, filed Apr. 22, 2016, which is hereby incorporated by reference herein in its entirety.

What is claimed is:

1. An image processing apparatus comprising:
at least one processor causing the image processing apparatus to act as units comprising:
(1) a division unit configured to divide input data into a plurality of regions;
(2) a generation unit configured to generate, from the divided input data corresponding to one region of the plurality of regions, intermediate data corresponding to the region;
(3) an updating unit configured to perform update processing for the intermediate data corresponding to the one region by converting, into single image data, a plurality of objects of the intermediate data corresponding to the one region;
(4) a transfer unit configured to transfer the intermediate data corresponding to the one region; and
(5) a determination unit configured to determine whether to perform the update processing for the intermediate data corresponding to the one region based on a predetermined condition,
wherein the determination unit performs the determination based on objects of the input data or based on a data size of the intermediate data corresponding to the one region, as the predetermined condition, and
wherein, in a case where it is determined that the update processing for first intermediate data corresponding to one region of the plurality of regions is to be performed, it is determined that the update processing for second intermediate data subsequent to the first intermediate data is also to be performed based on the determination result of the first intermediate data.

2. The apparatus according to claim 1, wherein the updating unit compresses the converted image data.

3. The apparatus according to claim 2, wherein the updating unit performs lossy compression as image compression of the image data.

4. The apparatus according to claim 1, wherein the determination unit performs the determination based on the number of image objects included in the input data.

5. The apparatus according to claim 1, wherein the determination unit performs the determination based on a data size of an image object included in the input data.

6. The apparatus according to claim 5, wherein the determination unit determines that the update processing for the first intermediate data corresponding to the one region of the plurality of regions is to be performed in a case where the data size of the image object included in the input data is larger than a threshold size.

7. The apparatus according to claim 1, wherein the determination unit performs the determination based on a data size of the intermediate data corresponding to the one region.

8. The apparatus according to claim 7, wherein the determination unit performs the determination based on whether the data size of the intermediate data corresponding to the one region is larger than a threshold size.

9. The apparatus according to claim 1, wherein the determination unit performs the determination based on a data size obtained by subtracting image data from the first intermediate data.

10. The apparatus according to claim 9, wherein the determination unit determines that the update processing for the first intermediate data corresponding to one region of the plurality of regions is to be performed in a case where the data size obtained by subtracting the image data from the first intermediate data is larger than a threshold size.

11. The apparatus according to claim 1, wherein the input data is expressed by a page description language.

12. The apparatus according to claim 1, wherein the input data is data on a page basis, and the intermediate data is a band basis.

13. The apparatus according to claim 1, wherein the input data is data on a document basis, and the intermediate data is on a page basis.

14. The apparatus according to claim 1, wherein in a case where it is determined that the update processing for the first intermediate data is to be performed, the updating unit performs the update processing for all intermediate data subsequent to the first intermediate data.

15. The apparatus according to claim 1, further comprising a rendering unit configured to render a raster image using the intermediate data.

16. An image processing method, comprising:
dividing input data into a plurality of regions;
generating, from the divided input data corresponding to one region of the plurality of regions, intermediate data corresponding to the one region;
performing update processing for the intermediate data corresponding to the one region by converting, into single image data, a plurality of objects of the intermediate data corresponding to the one region;
transferring the intermediate data corresponding to the one region; and
determining whether to perform the update processing for the intermediate data corresponding to the one region based on a predetermined condition,
wherein in the determining, the determination is performed based on objects of the input data or based on a data size of the intermediate data corresponding to the one region, as the predetermined condition, and wherein, in a case where it is determined that the update processing for first intermediate data corresponding to one region of the plurality of regions is to be performed, it is determined that the update processing for second intermediate data subsequent to the first intermediate data is also to be performed based on the determination result of the first intermediate data.

17. The method according to claim 16, wherein the converted image data is compressed in the updating.

18. The method according to claim 17, wherein in the updating, lossy compression is performed as image compression of the image data.

19. The method according to claim 16, wherein in the determining, the determination is performed based on the number of image objects included in the input data.

20. The method according to claim 16, wherein in the determining, the determination is performed based on a data size of an image object included in the input data.

21. The method according to claim 17, wherein in the determining, it is determined that the update processing for the first intermediate data corresponding to the one region of the plurality of regions is to be performed in a case where the data size of the image object included in the input data is larger than a threshold size.

22. The method according to claim 16, wherein in the determining, the determination is performed based on a data size of the intermediate data corresponding to the one region.

23. The method according to claim 22, wherein in the determining, the determination is performed based on whether the data size of the intermediate data corresponding to the one region is larger than a threshold size.

24. The method according to claim 16, wherein in the determining, the determination is performed based on a data size obtained by subtracting image data from the first intermediate data.

25. The method according to claim 24, wherein in the determining, it is determined that the update processing for the first intermediate data corresponding to one region of the plurality of regions is to be performed in a case where the data size obtained by subtracting the image data from the first intermediate data is larger than a threshold size.

26. The method according to claim 16, wherein the input data is expressed by a page description language.

27. The method according to claim 16, wherein the input data is data on a page basis, and the predetermined basis is a band basis.

28. The method according to claim 16, wherein the input data is data on a document basis, and the intermediate data is on a page basis.

29. The method according to claim 16, wherein in a case where it is determined that the update processing for the first intermediate data is to be performed, the update processing is performed for all intermediate data subsequent to the first intermediate data.

30. The method according to claim 16, further comprising rendering a raster image using the intermediate data.

31. A non-transitory computer-readable storage medium configured to store a program to cause a computer to function as an image processing apparatus comprising:
   a division unit configured to divide input data into a plurality of regions;
   a generation unit configured to generate, from the divided input data corresponding to one region of the plurality of regions, intermediate data corresponding to the one region;
   an updating unit configured to perform update processing for the intermediate data corresponding to the one region by converting, into single image data, a plurality of objects of the intermediate data corresponding to the one region;
   a transfer unit configured to transfer the intermediate data corresponding to the one region; and
   a determination unit configured to determine whether to perform the update processing for the intermediate data corresponding to the one region based on a predetermined condition,
   wherein the determination unit performs the determination based on objects of the input data or based on a data size of the intermediate data corresponding to the one region, as the predetermined condition, and
   wherein, in a case where it is determined that the update processing for first intermediate data corresponding to one region of the plurality of regions is to be performed, it is determined that the update processing for second intermediate data subsequent to the first intermediate data is also to be performed based on the determination result of the first intermediate data.

* * * * *